Patented Nov. 9, 1948

2,453,275

UNITED STATES PATENT OFFICE 2,453,275

PREPARATION OF MIXED SATURATED-UNSATURATED ESTERS OF CELLULOSE

George W. Seymour, Blanche B. White, and Elisabeth Barabash, Cumberland, Md., assignors to Celanese Corporation of America, a corporation of Delaware No Drawing. Application March 30, 1945,
Serial No. 585,794

15 Claims. (Cl. 260—225)

This invention relates to the production of mixed organic acid esters of cellulose containing radicals of both saturated and unsaturated aliphatic acids, and relates more particularly to the production of such mixed organic acid esters of cellulose which yield stable molded articles of a high degree of flexibility and elasticity.

An object of this invention is the preparation of mixed organic acid esters of cellulose containing both saturated and unsaturated aliphatic acid radicals.

Another object of this invention is to provide an improved process for the production of mixed organic acid esters of cellulose containing crotonyl groups, which esters are highly stable and yield flexible molded products of excellent clarity and color.

A further object of this invention is the production of cellulose butyrate-crotonate of excellent stability and molding characteristics.

Other objects of this invention will appear from the following detailed description.

Organic acid esters of cellulose are widely employed commercially for the production of films, foils and filaments, as well as for the production of a great variety of molded articles. A relatively large number of organic esters of cellulose are known but few are of any great commercial importance. The organic acid esters of cellulose employed most extensively are cellulose acetate, cellulose butyrate and cellulose acetate-butyrate. These esters are particularly characterized by their non-inflammability, stability, high impact and dielectric strength and the relative ease with which they may be fabricated into commercially valuable articles. Certain organic acid esters of cellulose containing unsaturated aliphatic acid radicals have been prepared but these cellulose esters usually were found to possess an undesirable degree of brittleness. The brittleness is believed to be due, in part at least, to cross-linkages, which cross-linking appears to take place because of the unsaturated nature of certain of the acid radicals which are present.

We have now found that improved mixed organic acid esters of cellulose containing both saturated and unsaturated aliphatic acid radicals and possessing a remarkable degree of toughness and elasticity may be obtained by a novel process in which cellulose is esterified employing an esterification reaction mixture comprising a saturated organic aliphatic acid anhydride and an unsaturated organic aliphatic acid anhydride, each having at least four carbon atoms in the acid radical, the esterification being effected in the presence of an acid esterification catalyst, and then subjecting the organic acid esters of cellulose obtained to hydrolysis and stabilization treatment. The esterification is preferably effected under such conditions that the mixed organic acid esters of cellulose produced contains a relatively small proportion of unsaturated acid groups. While some degree of cross-linking apparently exists in our novel mixed cellulose esters, the cross-linkages which are probably present do not contribute to produce any marked brittleness because of the longer chain length of the esterifying acid groups, which minimize such tendency and appear to be responsible for the outstanding toughness and elasticity of our novel esters.

While the novel process of our invention may be employed for the preparation of various mixed organic acid esters of cellulose containing both saturated and unsaturated aliphatic acid radicals of at least four carbon atoms, it will be more particularly described in connection with the preparation of cellulose butyrate-crotonate, the ester which we have found to possess the most satisfactory combination of properties.

In accordance with the novel process of our invention, cellulose butyrate-crotonate may be prepared by esterifying cellulose, preferably in an activated form, with an esterifying medium comprising 2 to 4 parts by weight of butyric acid anhydride, 1 to 3 parts by weight of crotonic acid anhydride and 0.03 to 0.10 part by weight of an acid esterification catalyst, the esterifying medium being maintained at a relatively low temperature during the course of the esterification reaction, hydrolyzing the mixed ester produced, in solution, so as to remove any combined catalyst, and then stabilizing the ester.

Preferably, the ratio of acid anhydrides in the esterification medium should comprise about 2.4 parts by weight of butyric acid anhydride to 1.2 parts by weight of crotonic acid anhydride or about two mols of butyric anhydride to each mol of crotonic acid anhydride present so that the cellulose butyrate-crotonate obtained contains from about 0.20 to about 0.30 crotonyl groups per glucose residue.

The cellulose butyrate-crotonates having these characteristics may be molded very satisfactorily at temperatures up to about 200° C., with or without the use of a plasticizer, and the molded articles obtained possess an unusual degree of toughness and flexibility.

The activation or pretreatment of the cellulose, which treatment is designed to render the cellulose more reactive when subjected to esterification with the mixture of anhydrides, is preferably effected by adding butyric acid and a suitable swelling agent to the cellulose, tumbling the mixture obtained to insure thorough mixing and then allowing the mixture to stand at about room temperature until the desired activation is obtained. The most effective pretreatment comprises adding from 2 to 3 parts by weight of butyric acid and 0.02 to 0.5 part of formic acid to the cellulose, tumbling until thoroughly mixed and allowing the pretreatment to continue at about room temperature for 16 to 60 hours. In lieu of formic acid, from 3 to 4 parts of nitromethane may be employed together with the above-mentioned quantity of butyric acid for the pretreatment and pretreatment continued also for about 16 to 60 hours. Where other swelling agents are employed, they must be so chosen that they will not react with the cellulose. Thus, it is advisable to avoid the use of acetic acid as a swelling agent since its presence will lead to the introduction of combined acetyl groups. It has been found on the other hand, however, that formic acid is an effective swelling agent but that due to its chemical instability its use does not lead to the introduction of formyl groups.

The pretreated and activated cellulose is then esterified. The esterification is preferably effected after cooling the pretreated cellulose together with the pretreatment liquid to a temperature of 2 to 5° C., by adding the cooled cellulose mixture to an esterification medium comprising a mixture of butyric and crotonic acid anhydrides together with the desired esterification catalyst. The esterification medium should also be precooled to a temperature of −10 to +10° C. and preferably to a temperature of about −10° C., prior to esterification. While perchloric acid in amounts of from 1 to 4% by weight may be employed as the catalyst, we preferably employ sulfuric acid and in an amount of from 3 to 10% on the weight of the cellulose esterified, with from 3.75 to 7.5% yielding optimum results.

All of the sulfuric acid catalyst may be present in the esterification medium when the activated cotton is entered therein. Preferably, however, we add only about 50 to 75% of the total amount of catalyst employed to the esterification mixture at the beginning of esterification and, after esterification has proceeded to the point where the charge begins to clear, which will be after the esterification has continued for 8 to 16 hours, the remainder of the catalyst, together with a small amount of butyric acid anhydride, may then be added. Optimum results are obtained employing only about 75% of the total catalyst at the start of esterification and adding the remainder at a subsequent stage. The temperature may be allowed to rise as esterification proceeds, the maximum temperature being controlled by suitable cooling means so that the reaction does not go over about 15° C. throughout the course of the esterification.

At the completion of esterification the combined sulfates in the cellulose butyrate-crotonate formed should be removed by a suitable hydrolysis reaction, which hydrolysis may be effected by adding from 10 to 25 parts by weight of water, on the weight of the cellulose employed, to the reaction mixture and then agitating the charge, which should preferably be at room temperature, for 2 to 4 hours.

The catalyst remaining is then neutralized and the cellulose butyrate-crotonate precipitated from solution by the addition of an excess amount of water thereto. The fibrous precipitate obtained may be washed neutral and then dried. Where the precipitated cellulose butyrate-crotonate tends to form a gel-like precipitate, it may be converted to the desired fibrous form by redissolving the gel-like precipitate in glacial acetic acid and reprecipitating.

The color of the cellulose butyrate-crotonate produced in accordance with our novel process may be improved by a suitable bleaching treatment. The bleaching treatment may be effected either prior to precipitation, following precipitation, or, most advantageously, is carried out both before precipitation, i. e. while the cellulose butyrate-crotonate is still in solution, and then after precipitation, when the cellulose butyrate-crotonate is in the fibrous form obtained on precipitation. The bleaching treatment preferably employed comprises adding from 0.025 to 0.030 part by weight of a 30% aqueous solution of hydrogen peroxide to the esterification mixture and allowing the bleaching agent to act on the cellulose ester in solution for 10 to 30 minutes. When bleaching the dried, precipitated and stabilized cellulose butyrate-crotonate, aqueous solutions of hydrogen peroxide of a concentration of 1.0 to 1.5% by weight are suitable and produce a satisfactory degree of bleaching in from 60 to 90 minutes at a temperature of 25 to 30° C. In lieu of hydrogen peroxide, other bleaching agents which may be employed are, for example, $NaOCl$, $CaOCl_2$, or $Na_2SO_3$.

The stabilization of the precipitated cellulose butyrate crotonate to remove combined sulfates and to produce an ester capable of being molded satisfactorily at high temperatures can be accomplished by any of a number of effective methods. For instance, the ester may be subjected to treatment with a mixture of alcohol and water of such concentration that it will not solubilize the ester, for example, 30 parts alcohol in 70 parts water, which solution contains sulfuric acid in concentrations of 0.01 to 0.05%. The ester may be satisfactorily stabilized by being refluxed with this mixture for 2 to 4 hours prior to washing, bleaching and drying. A second method of stabilization, which has been found effective, consists in kneading the dried unstabilized ester in an aqueous solution of acetone or methyl ethyl ketone, the concentration of the organic solvent therein being such as to maintain the cellulose ester in a doughy form. Magnesium carbonate is added at intervals to the supernatant liquid, the addition being continued until the pH of the liquid during stabilization is at the desired value of 6.9 to 7.1. The preferred method of stabilization, however, consists in heating the ester with approximately 6 to 10 times its volume of 0.02 to 0.05% aqueous sulfuric acid under pressure of 15 to 25 pounds per square inch at a temperature of 120 to 130° C. for 2 to 4 hours. The stabilized cellulose butyrate-crotonate may then be dissolved in acetone and reprecipitated in fibrous form with an excess of water, washed, bleached again with hydrogen peroxide while in fibrous form and then dried.

The cellulose butyrate-crotonate obtained by our novel process may be molded very satisfactorily at 200° C. both with and without a plasticizer. When molded without a plasticizer clear, tough molded articles are obtained. Where from 20 to 40%, say 30%, of a plasticizer such as dibutyl phthalate is employed, the temperature at which molding may be effected may be below 200° C., say 165° C. and a clear, tough plastic article of remarkable flexibility may be obtained.

In order further to illustrate our invention but without being limited thereto, the following example is given:

*Example*

150 parts by weight of cotton linters are pretreated by being agitated for 1 hour in a mixture of 450 parts by weight of butyric acid and 30 parts by weight of formic acid at room temperature and then allowed to stand for a total pretreatment time of about 58 hours. The pretreated cotton, together with the liquid pretreatment mixture, is cooled to about −10° C. and then entered into an esterification medium comprising 360 parts by weight of butyric acid anhydride, 180 parts by weight of crotonic acid anhydride to which has been added 8.6 parts by weight of sulfuric acid dissolved in 120 parts by weight of butyric acid anhydride. Esterification of the cellulose takes place with a gradual rise in the temperature of the reaction medium, which temperature is controlled, however, so that it rises only to about 15° C. during the first 5.5 hours. Esterification is continued for another 6.5 hours at 15° C. and then 2.9 parts by weight of sulfuric acid in 16 parts by weight of butyric acid anhydride are added. Esterification is allowed to continue for a total esterification time of 20 hours. At this point, 25% of water on the weight of the cotton is added and the combined sulfates are hydrolyzed from the ester in solution by stirring the charge at a temperature of about 25° C. for 4 hours.

The cellulose butyrate-crotonate in solution is subjected to a bleaching treatment by adding 750 parts of glacial acetic acid containing 4.9 parts by weight of a 30% aqueous solution of hydrogen peroxide and allowing the bleaching treatment to continue for a period of 20 minutes. The sulfuric acid catalyst present is then neutralized by the addition of magnesium carbonate to the solution and the cellulose butyrate-crotonate then precipitated from solution by the addition of an excess of water thereto. The precipitate obtained is redissolved in glacial acetic acid and reprecipitated to attain the desired open, fibrous type of precipitate. The cellulose butyrate-crotonate precipitate is then washed with water, extracted four times with 0.01% aqueous sulfuric acid to remove any occluded magnesium salts, washed neutral and then dried.

Stabilization of the dried cellulose butyrate-crotonate obtained may be effected by heating the dried ester under 20 pounds steam pressure at a temperature of about 125° C. for 2 to 4 hours with 6 to 10 volumes of 0.02 to 0.05% aqueous sulfuric acid. At the end of this time, the liquor is drained from the charge, the cellulose butyrate-crotonate washed neutral, bleached and dried. Other methods of stabilization, as given above, may also be used. The cellulose butyrate-crotonate obtained is fully esterified and has a butyryl value of 71.6% and a crotonyl value of 4.9%, each calculated as the corresponding acid, which corresponds to 2.79 butyryl groups and 0.21 crotonyl groups per glucose residue. The ester does not contain any free hydroxy groups.

When molded in the form of a disc for 15 minutes at 200° C. without any plasticizer, the disc obtained is clear and tough. When molded with the addition of 30% by weight of dibutyl phthalate at 165° C. for 15 minutes, a clear, flexible and elastic molded product is obtained.

It is to be understood that the foregoing detailed description is given merely by way of illustration and that many variations may be made therein without departing from the spirit of our invention.

Having described our invention, what we desire to secure by Letters Patent is:

1. Process for the production of mixed organic acid esters of cellulose containing radicals of both saturated and unsaturated aliphatic acids having at least four carbon atoms in the acid radical, which comprises esterifying cellulose with an esterification medium comprising an inorganic acid esterification catalyst, about two mols of the anhydride of a saturated aliphatic acid and one mol of the anhydride of an unsaturated aliphatic acid, each having at least four carbon atoms in the acid radical, allowing the esterification to proceed, adding an additional amount of the saturated aliphatic acid anhydride, and allowing the esterification to proceed to completion.

2. Process for the production of mixed organic acid esters of cellulose containing radicals of both saturated and unsaturated aliphatic acids having at least four carbon atoms in the acid radical, which comprises esterifying cellulose with an esterification medium comprising an inorganic acid esterification catalyst, about two mols of the anhydride of a saturated aliphatic acid and one mol of the anhydride of an unsaturated aliphatic acid, each having at least four carbon atoms in the acid radical, allowing the esterification to proceed, adding a further quantity of catalyst in an amount of from 33⅓% to 100% of the amount originally employed together with an additional amount of the saturated aliphatic acid anhydride, hydrolyzing any combined acid catalyst from the cellulose ester formed, precipitating the ester from solution and stabilizing the cellulose ester.

3. Process for the production of cellulose butyrate-crotonate, which comprises esterifying cellulose with an esterification medium comprising a mixture of about two mols butyric acid anhydride and one mol of crotonic acid anhydride containing an inorganic acid esterification catalyst, allowing the esterification to proceed, adding a further quantity of catalyst in an amount of from 33⅓% to 100% of the amount originally employed together with an additional amount of butyric acid anhydride, and allowing the esterification to proceed to completion.

4. Process for the production of cellulose butyrate-crotonate, which comprises esterifying cellulose with an esterification medium comprising a mixture of about two mols of butyric acid anhydride and one mol of crotonic acid anhydride containing an inorganic acid esterification catalyst, allowing the esterification to proceed, adding a further quantity of catalyst in an amount of from 33⅓% to 100% of the amount originally employed together with an additional amount of butyric acid anhydride, hydrolyzing any combined acid catalyst from the cellulose butyrate-crotonate formed, precipitating the ester from solution and stabilizing the precipitated cellulose butyrate-crotonate.

5. Process for the production of cellulose butyrate-crotonate, which comprises esterifying cellulose with an esterification medium comprising a mixture of about two mols of butyric acid anhydride and one mol of crotonic acid anhydride containing sulfuric acid as esterification catalyst, allowing the esterification to proceed, adding a further quantity of sulfuric acid in an amount of from 33⅓% to 100% of the amount originally employed together with an additional amount of butyric acid anhydride, and allowing the esterification to proceed to completion.

6. Process for the production of cellulose butyrate-crotonate, which comprises esterifying pretreated cellulose, activated with a mixture of butyric acid and a swelling agent, with an esterification medium comprising a mixture of about two mols of butyric acid anhydride and one mol of crotonic acid anhydride containing sulfuric acid as esterification catalyst, allowing the esterification to proceed, adding a further quantity of sulfuric acid in an amount of from 33⅓% to 100% of the amount originally employed together with an additional amount of butyric acid anhydride, and allowing the esterification to proceed to completion.

7. Process for the production of cellulose butyrate-crotonate, which comprises esterifying pretreated cellulose, activated with a mixture of butyric acid and formic acid, with an esterification medium comprising a mixture of about two mols of butyric acid anhydride and one mol of crotonic acid anhydride containing sulfuric acid as esterification catalyst, allowing the esterification to proceed, adding a further quantity of sulfuric acid in an amount of from 33⅓% to 100% of the amount originally employed together with an additional amount of butyric acid anhydride, and allowing the esterification to proceed to completion.

8. Process for the production of cellulose butyrate-crotonate, which comprises esterifying pretreated cellulose, activated with a mixture of butyric acid and nitromethane, with an esterification medium comprising a mixture of about two mols of butyric acid anhydride and one mol of crotonic acid anhydride containing surfuric acid as esterification catalyst, allowing the esterification to proceed, adding a further quantity of surfuric acid in an amount of from 33⅓% to 100% of the amount originally employed together with an additional amount of butyric acid anhydride, and allowing the esterification to proceed to completion.

9. Process for the production of cellulose butyrate-crotonate, which comprises esterifying pretreated cellulose, activated with a mixture of butyric acid and a swelling agent with an esterification medium comprising a mixture of 2 to 4 parts by weight of butyric acid anhydride and 1 to 3 parts by weight of crotonic acid anyhdride containing sulfuric acid as esterification catalyst, allowing the esterification to proceed, adding a further quantity of sulfuric acid in an amount of from 33⅓% to 100% of the amount originally of employed together with an additional amount of butyric acid anhydride, and allowing the esterification to proceed to completion.

10. Process for the production of cellulose butyrate-crotonate containing about 0.20 crotonyl groups per glucose residue, which comprises esterifying pretreated cellulose activated with a mixture of butyric acid and a swelling agent with an esterification medium comprising a mixture of 2 to 4 parts by weight of butyric acid anhydride and 1 to 3 parts by weight of crotonic acid anhydride containing 3.75 to 7.5% by weight on the cellulose of sulfuric acid as esterification catalyst, allowing the esterification to proceed until the reaction mixture begins to clear, adding a further quantity of sulfuric acid in an amount of from 33⅓% to 100% of the amount originally employed and butyric acid anhydride, and allowing the esterification to go to completion.

11. Process for the production of cellulose butyrate-crotonate containing about 0.20 crotonyl groups per glucose residue, which comprises esterifying pretreated cellulose activated with a mixture of butyric acid and a swelling agent with an esterification medium comprising a mixture of 2 to 4 parts by weight of butyric acid anhydride and 1 to 3 parts by weight of crotonic acid anhydride containing 3.75 to 7.5% by weight on the cellulose of sulfuric acid as esterification catalyst, allowing the esterification to proceed until the reaction mixture begins to clear, adding a further quantity of sulfuric acid in an amount of from 33⅓% to 100% of the amount originally employed and butyric acid anhydride, allowing the esterification to go to completion, adding 10 to 25% by weight of water on the cellulose to the reaction mixture and hydrolyzing any combined sulfates, precipitating the cellulose butyrate-crotonate from solution by the addition of an excess of water thereto, and stabilizing the precipitated cellulose butyrate-crotonate by heating with aqueous sulfuric acid.

12. Process for the production of cellulose butyrate-crotonate containing about 0.20 crotonyl groups per glucose residue, which comprises esterifying pretreated cellulose, activated with a mixture of butyric acid and formic acid, with an esterification medium comprising a mixture of 2 to 4 parts by weight of butyric acid anhydride and 1 to 3 parts by weight of crotonic acid anhydride containing 3.75 to 7.5% by weight on the cellulose of sulfuric acid as esterification catalyst, allowing the esterification to proceed until the reaction mixture begins to clear, adding a further quantity of sulfuric acid in an amount of from 33⅓% to 100% of the amount originally employed and butyric acid anhydride, allowing the esterification to go to completion, adding 10 to 25% by weight of water on the cellulose to the reaction mixture and hydrolyzing any combined sulfates, adding hydrogen peroxide in aqueous acetic acid to the reaction mixture and allowing it to effect a bleaching of the cellulose butyrate-crotonate in solution, precipitating the cellulose butyrate-crotonate from solution by the addition of an excess of water thereto, and stabilizing the precipitated cellulose butyrate-crotonate by heating with aqueous sulfuric acid.

13. Process for the production of cellulose butyrate-crotonate containing about 0.20 crotonyl groups per glucose residue, which comprises esterifying pretreated cellulose activated with a mixture of butyric acid and formic acid with an esterification medium comprising a mixture of 2 to 4 parts by weight of butyric acid anhydride and 1 to 3 parts by weight of crotonic acid anhydride containing 3.75 to 7.5% by weight on the cellulose of sulfuric acid as esterification catalyst, allowing the esterification to proceed until the reaction mixture begins to clear, adding a further quantity of sulfuric acid in an amount of from 33⅓% to 100% of the amount originally employed and butyric acid anhydride, allowing the esterification to go to completion, adding 10 to 25% by weight of water on the cellulose to the reaction mixture and hydrolyzing any combined sulfates, adding hydrogen peroxide in aqueous acetic acid to the reaction mixture and allowing it to effect a bleaching of the cellulose butyrate-crotonate in solution, precipitating the cellulose butyrate-crotonate from solution by the addition of an excess of water thereto, and stabilizing the precipitated cellulose butyrate-crotonate by heating under pressure at a temperature of 120 to 130° C. with aqueous sulfuric acid.

14. As a new article of manufacture, cellulose butyrate-crotonate containing from 0.2 to 0.3 crotonyl groups per glucose residue.

15. As a new article of manufacture, cellulose butyrate-crotonate containing about 0.20 crotonyl groups per glucose residue.

GEORGE W. SEYMOUR.
   BLANCHE B. WHITE.
   ELISABETH BARABASH.

REFERENCES CITED

The following references are of record in the file of this patent:

UNITED STATES PATENTS

| Number | Name | Date |
|---|---|---|
| 1,940,710 | Dreyfus | Dec. 26, 1933 |
| 1,945,310 | Fothergill et al. | Jan. 30, 1934 |
| 2,028,763 | Dreyfus | Jan. 28, 1936 |
| 2,076,555 | Fothergill | Apr. 13, 1937 |
| 2,170,016 | Fordyce et al. | Aug. 22, 1939 |

FOREIGN PATENTS

| Number | Country | Date |
|---|---|---|
| 471,894 | Great Britain | Sept. 13, 1937 |